United States Patent
Smith et al.

(10) Patent No.: US 10,557,598 B2
(45) Date of Patent: Feb. 11, 2020

(54) FLOOR LAMP WITH INTEGRATED PLANT GROWTH SYSTEM

(71) Applicants: Jennifer Leigh Smith, Parkland, FL (US); Joe Bernal, Miami, FL (US)

(72) Inventors: Jennifer Leigh Smith, Parkland, FL (US); Joe Bernal, Miami, FL (US)

(73) Assignee: Evolution Lighting, LLC, Miami Lakes, FL (US)

( * ) Notice: Subject to any disclaimer, the term of this patent is extended or adjusted under 35 U.S.C. 154(b) by 233 days.

(21) Appl. No.: 15/445,583

(22) Filed: Feb. 28, 2017

(65) Prior Publication Data

US 2017/0167671 A1    Jun. 15, 2017

Related U.S. Application Data

(63) Continuation-in-part of application No. 29/546,289, filed on Nov. 20, 2015, now Pat. No. Des. 780,368, and a continuation-in-part of application No. 29/546,295, filed on Nov. 20, 2015, now Pat. No. Des. 781,478.

(51) Int. Cl.
| | | |
|---|---|---|
| *F21S 6/00* | (2006.01) | |
| *F21Y 115/10* | (2016.01) | |
| *F21Y 113/13* | (2016.01) | |

(52) U.S. Cl.
CPC .......... *F21S 6/008* (2013.01); *F21Y 2113/13* (2016.08); *F21Y 2115/10* (2016.08)

(58) Field of Classification Search
CPC .... A01G 9/024; A47G 2200/08; A47G 7/044; A47G 7/042; A47G 7/00; A47G 7/02
See application file for complete search history.

(56) References Cited

U.S. PATENT DOCUMENTS

| | | | |
|---|---|---|---|
| 884,924 A | | 4/1908 | Helmschmied |
| 2,408,522 A | | 10/1946 | Leef |
| 3,950,637 A | | 4/1976 | Rodin |
| 4,562,521 A | * | 12/1985 | Noguchi ................. F21S 6/002 362/352 |
| 4,779,377 A | | 10/1988 | Davis |
| 4,941,283 A | * | 7/1990 | Armstrong ............. A47G 7/042 248/163.2 |
| 5,065,971 A | | 11/1991 | Gaube |
| (Continued) | | | |

FOREIGN PATENT DOCUMENTS

KR    20160105760 A    9/2016

*Primary Examiner* — Andrew J Coughlin
(74) *Attorney, Agent, or Firm* — Grenberg Traurig, LLC

(57) ABSTRACT

A luminaire has three or more substantially rigid legs each having an upper end and a lower end. The three or more legs are arranged in a frustum shape forming a central area. The upper ends of the three or more legs at least partially converge and are fixed with respect to each other. The luminaire includes a first lamp fixed to the top ends of the three or more legs and operable to emit light in a substantially upward direction, and a second lamp fixed to the top ends of the three or more legs and operable to emit light in a substantially downward direction. Additionally, the luminaire includes three or more suspension members each having an end that is removably secured to a respective leg. Each of the three or more suspension members have individually adjustable lengths and are configured to maintain a suspended planter.

20 Claims, 6 Drawing Sheets

(56) References Cited

U.S. PATENT DOCUMENTS

| | | | |
|---|---|---|---|
| 5,412,554 A | 5/1995 | Lee | |
| 5,528,479 A * | 6/1996 | Chen | F21S 6/005 |
| | | | 248/163.1 |
| 5,860,248 A * | 1/1999 | Peters | A47G 7/047 |
| | | | 47/66.6 |
| 6,318,880 B1 * | 11/2001 | Siminovitch | F21V 23/04 |
| | | | 362/216 |
| 6,448,387 B1 | 12/2002 | Wardenburg | |
| 6,789,916 B2 | 9/2004 | Ruggles | |
| 6,921,182 B2 | 7/2005 | Anderson et al. | |
| D670,420 S | 11/2012 | Hui | |
| 8,776,431 B1 * | 7/2014 | Wiseman | A47G 7/02 |
| | | | 47/39 |
| D762,904 S | 8/2016 | Schmitt | |
| 10,100,987 B1 * | 10/2018 | Dell'Ario | F21S 6/008 |
| 2004/0179354 A1 | 9/2004 | Chen | |
| 2006/0112633 A1 * | 6/2006 | Humphrey | A47G 7/041 |
| | | | 47/66.6 |
| 2007/0084114 A1 * | 4/2007 | Simmons | A01G 27/005 |
| | | | 47/82 |
| 2008/0083162 A1 * | 4/2008 | Vandyken | A47G 7/042 |
| | | | 47/39 |
| 2009/0323318 A1 | 12/2009 | Chan | |
| 2010/0175318 A1 | 7/2010 | Ahmadi | |
| 2012/0267486 A1 | 10/2012 | Hyp et al. | |
| 2013/0039045 A1 * | 2/2013 | Colby | F21L 4/08 |
| | | | 362/183 |
| 2013/0094191 A1 * | 4/2013 | Cohen | F21S 9/037 |
| | | | 362/122 |
| 2014/0022773 A1 * | 1/2014 | Colby | F21S 9/037 |
| | | | 362/183 |
| 2014/0069007 A1 | 3/2014 | Chen et al. | |
| 2016/0192598 A1 | 7/2016 | Haggarty | |

\* cited by examiner

FLOOR LAMP WITH INTEGRATED PLANT GROWTH SYSTEM

RELATED APPLICATION INFORMATION

This application is a continuation-in-part of U.S. Design patent application Ser. No. 29/546,295, filed Nov. 20, 2015, and U.S. Design patent application Ser. No. 29/546,289, filed Nov. 20, 2015, the entire disclosures and drawings of which are incorporated herein by reference.

FIELD OF THE INVENTION

The present invention relates to floor lamps with integrated plant growth systems.

BACKGROUND OF THE INVENTION

Since the invention of the electric light bulb over a hundred years ago, lighting solutions have been developed to bring electric lighting into the homes of consumers. Light fixtures and luminaires come in a variety of forms, including table lamps, sconces, floor lamps, and chandeliers. Some light fixtures have even been integrated into or combined with existing pieces of furniture—such as cabinets, shelves, and étagères—to provide both pleasing aesthetics and illumination to a room.

As humans continue to spend more of their time indoors, it can be desirable to bring plant life into indoor environments as well. Potted plants, flowers, and even trees can be sustained indoors for a limited amount of time, bringing vegetation indoors and "sprucing" up indoor décor.

However, many kinds of plant life require specific environmental conditions in order to grow and thrive. Because sunlight can be filtered through windows and otherwise be limited indoors, some plants are typically not suitable for indoor growth.

Some plant growth solutions exist that attempt to provide supplemental lighting and/or watering to encourage and facilitate plant growth. However, these solutions are often industrial and intended for large controlled plant growth operations and are inappropriate for an in-home solution.

It is accordingly an objective of the present invention to provide lighting solutions that are aesthetically pleasing, suitable as in-home décor, and that can facilitate plant growth.

In addition, plants grow in size and may outgrow the constraints of the planter or structure to which the planter is coupled. For example, a hanging planter may house a vertically-growing plant that, once grown to a certain height, can no longer fit within the hanging structure (e.g., the plant abuts a ceiling or other structure). Furthermore, the intensity of light and/or the proximity of light may affect the growth of a plant. It is therefore another objective of the present invention to provide lighting solutions with adjustable elements for varying the distance between a grow light and a plant.

Some plants grow more effectively under controlled conditions without ambient or environmental light. Thus, a further objective of the present invention is to provide lighting solutions that allow for the modulation of ambient or environmental light.

These and other objectives and advantages will become apparent from the following detailed written description and figures.

SUMMARY OF THE INVENTION

According to a first aspect of the present invention, there is provided a luminaire having three or more substantially rigid legs each having an upper end and a lower end. The three or more legs are arranged in a frustum shape forming a central area. The upper ends of the three or more legs at least partially converge and are fixed with respect to each other, while the lower ends of the three or more legs at least partially diverge and are substantially coplanar to support the luminaire in an upright position on a ground surface. The luminaire also includes a first lamp fixed to the top ends of the three or more legs and operable to emit light in a substantially upward direction. The luminaire further includes a second lamp fixed to the top ends of the three or more legs and operable to emit light in a substantially downward direction. Additionally, the luminaire includes three or more suspension members each having an end that is removably secured to a respective leg. Each of the three or more suspension members have individually adjustable lengths and are configured to maintain a suspended planter substantially level with respect to the ground surface, in which the height of the planter can be readily raised and lowered.

The second lamp can be, in some implementations, a grow light. The grow light may be operable to emit photosynthetically active radiation having wavelengths between 400 nanometers (nm) and 750 nm, although other wavelengths of light are also possible. The grow light may also include one or more white LEDs with a color temperature of 6500 K, to encourage and promote plant growth.

Each suspension member may include a plurality of links that collectively form a chain. Each leg includes a hook positioned proximate to the upper end of the leg, which are adapted to engage with the links of respective suspension members. The length of each chain is adjustable by either selectively engaging a particular link of the suspension member with its respective hook, or by selectively removing one or more links from the chain.

The second lamp may include one or more light emitting diodes (LEDs) of a first type operable to at least emit a first wavelength of light and one or more LEDs of a second type operable to at least emit a second wavelength of light. A combination of light emitted from the one or more LEDs of the first type and the one or more LEDs of the second type facilitates growth of photosynthetic organisms. The first wavelength may be 660 nm (red light), while the second wavelength may be 460 nm (blue light). Other wavelengths are also possible.

The second lamp may also include a driver and a substantially cylindrical reflector. The driver is configured to control both the one or more LEDs of the first type and the one or more LEDs of the second type. The reflector has an opening at a bottom end of the reflector, which integrally surrounds the one or more LEDs of the first type and the one or more LEDs of the second type.

The driver may include a timer assembly configured to turn on the one or more LEDs of the first type and the one or more LEDs of the second type for a first duration of time and turn off the one or more LEDs of the first type and the one or more LEDs of the second type for a second duration of time. The timer assembly may include a display unit and one or more switches. The display unit is configured to display information related to the timer assembly, such as the amount of time remaining on the timer. The one or more switches are configured to adjust operation parameters of the timer assembly, such as the duration of the timer.

The luminaire may also include a substantially cylindrical shade arranged to integrally surround the first lamp and the second lamp. The shade has openings at both the top end and the bottom end of the shade. The shade may be translucent and configured to diffuse light emitted by at least the first lamp. The shade may also be shaped as a conical frustum.

The luminaire may further include a platform fixed to the three or more legs, which are substantially parallel with the plane defined by the lower ends of said three or more legs. The platform is to support a receptacle, such as a planter or planter tray.

The three or more legs may be formed from a plurality of separable segments, each segment being adapted to engage with one or more neighboring segments.

The upper ends of the three or more legs, a bottom portion of the first lamp, and a top portion of the second lamp may be coupled to a central support structure. The central support structure maintains a spaced relationship between the upper ends of the three or more legs, a bottom portion of the first lamp, and a top portion of the second lamp.

The luminaire further includes a shroud configured to be removably securable to the three or more legs to integrally surround the central area. The shroud may be opaque to block at least a portion of environmental light from entering the central area when the shroud is secured to the three or more legs.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

Figure 1:
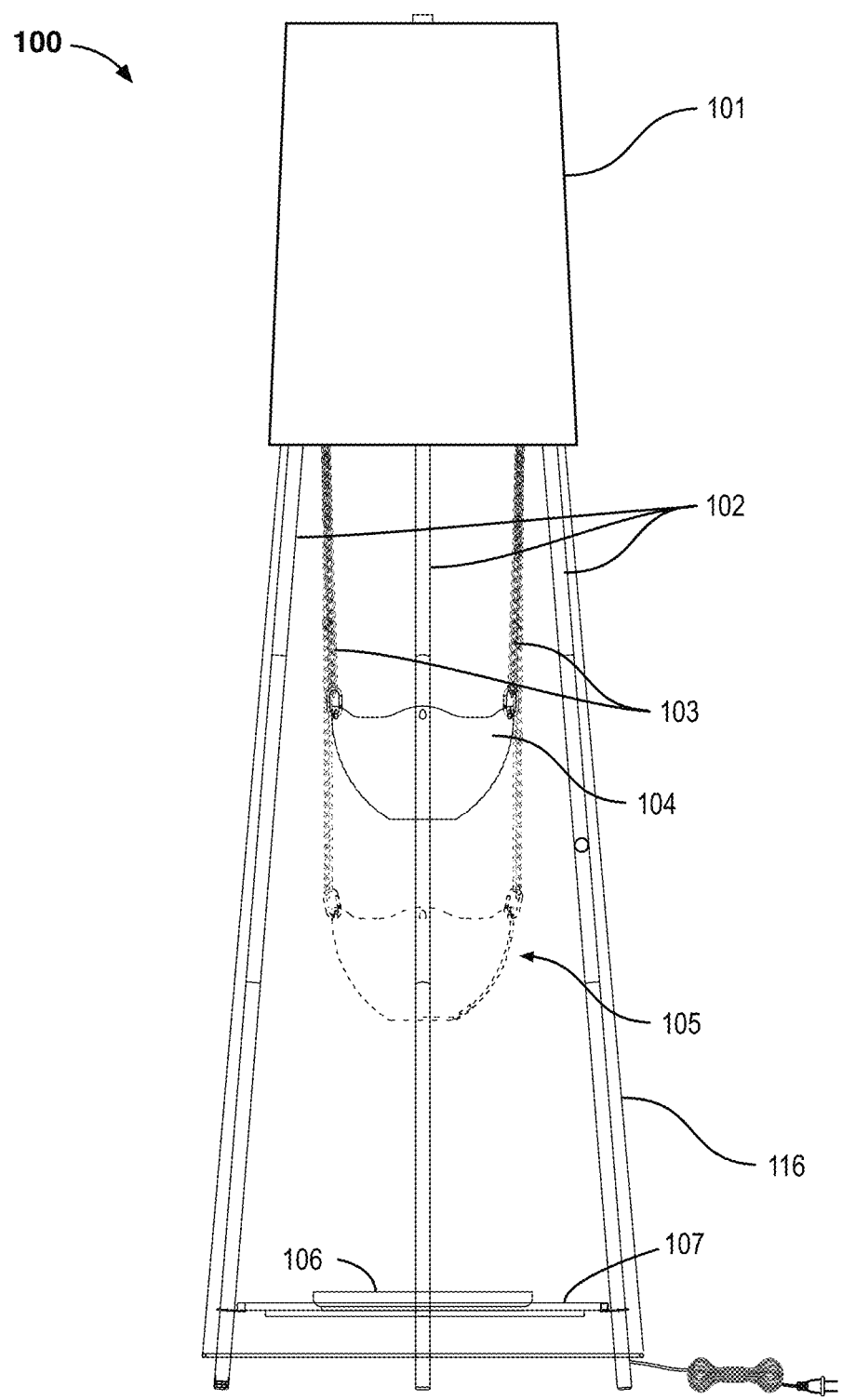
FIG. 1 is an elevated side view of an example floor lamp with an integrated plant growth system.

There will now be described by way of examples, several specific modes of the invention as contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

The present application discloses lighting systems with integrated plant growth systems, which are suitable for in-home use. An example lighting system is a floor lamp that includes three or more legs, an uplight, a downlight, and chains suitable for supporting a suspending planter. The three or more legs may form a tripod or quadropod that allow the lighting system to be stable when put in an upright position. The uplight may be any type of light source to provide general indoor lighting, such as an incandescent bulb, a fluorescent bulb, a halogen bulb, or an LED bulb. The downlight may be any type of lighting element capable of facilitating plant growth (i.e., provide photosynthetically active radiation (PAR)). The chains may be adjustable in length and capable of supporting a suspended planter in a region between the legs.

The downlight may include a driver for controlling the growth-facilitating lighting element(s) of the downlight. As one example, the downlight may include a combination of two or more types of LEDs (e.g., red and blue) that can be turned on and off via the driver. In some instances, the driver may include a timer capable of turning the LEDs on and off at predetermined intervals (e.g., intervals to simulate the natural day and night cycle). The brightness, timing, color temperature, and combination of LEDs may be configured to provide optimal growth conditions for a particular type of vegetation.

Some lighting systems described herein may also include removably attachable opaque shrouds or covers to block or modulate ambient light from being incident on a plant within the planter. As one example, a floor lamp may include opaque shroud that can be secured around the legs of the floor lamp to block ambient light from entering within the central region between the legs in which the planter is suspended. The shroud may be rolled up or otherwise made to partially cover the central region to reduce the amount of ambient environmental light that would otherwise be incident on the plant.

Although the lighting solutions herein are focused on floor lamps, other light fixtures or structures can also be used.

As described herein, a "luminaire" refers to an electric lighting system. Luminaires may include any number of light sources, including incandescent light bulbs, fluorescent light bulbs, light emitting diodes (LEDs), or any combination thereof. Luminaires may include structural elements onto which one or more lamps are mounted, fixed, or otherwise coupled. A floor lamp may be one example luminaire.

As described herein, a "lamp" refers to a lighting element within a luminaire. A lamp may include one or more individual light sources of any type. Some lamps can include shades or other components for partially obscuring or diffusing light emitted by the lamp's light source(s). A lamp may direct light primarily in a particular direction. As one example, a luminaire includes a lamp for shining light upwardly and/or outwardly, for general environmental lighting, and another lamp for shining downwardly toward a planter for facilitating plant growth.

As described herein, an "uplight" refers to a lamp whose light is directed substantially upwardly and/or outwardly. A typical floor lamp, for example, includes an "uplight" that shines upwardly to provide indirect illumination of an indoor space. Although an uplight is directed substantially upwardly, it should be understood that some of the light emitted may also shine horizontally and/or downwardly.

As described herein, a "downlight" refers to a lamp whose light is directed substantially downwardly. An example downlight is a grow light included within the lighting solutions described herein.

As described herein, a "planter" refers to any type of receptacle suitable for holding plants, soil, or other items for growing plants. Planters may be shaped as bowls, cylinders, or any other shape to hold therein soil and/or plants. Some planters include holes or orifices that allow water to drain therethrough to prevent a plant from being overwatered.

As described herein, a "suspension member" refers to any elongated rope, cord, chain, or other tension member that can support and maintain a planter. Suspension members described herein may be adjustable in length, either through adding and/or removing subcomponents of the suspension member (e.g., links within a chain) or by adjusting the mounting points of that suspension member with respect to their mounting locations (e.g., selectively engaging a particular link within a chain to a corresponding hook).

FIG. 1 is a side view 100 of an example floor lamp with an integrated plant growth system. Side view 100 of the example floor lamp depicts a shade 101, legs 102, suspension members 103, planter 104 in a first position, planter 104 in a second position 105, tray 106, platform 107, and shroud 116.

Shade 101 may be of any type material—including fabric, glass, or plastic—that at least horizontally obscures the light source 108. The shade 101 may be opaque or translucent, depending on the desired aesthetic effect. The presence of shade 101 may cause the light source 108 to be directed substantially upward when the floor lamp is in an upright position.

The legs 102 may be support structures that at least partially converge at the top and diverge at the bottom to provide a stable structure that resists tipping from horizontal forces. The legs 102 may be formed from plastic or metal, and may include ornamental features to enhance the aesthetics of the floor lamp. The legs 102 might meet or be joined at their top ends to form a fulcrum to which other elements such as the light source 108 and downlight 111 are secured. In other instances, the legs 102 may be fixed or coupled to central support structure 110 (shown in FIG. 2)

In some cases, the legs 102 include multiple separable segments that can be assembled to form legs 102. Such separable leg segments may be used to allow the floor lamp to be sold in compact packages. In other cases, the legs 102 may be telescopic and can be extended and/or retracted for ease of transportation and to permit the overall height of the floor lamp to be adjusted.

The suspension members 103, as described above, may comprise adjustable ropes, chains, cords, or other tension elements that can support and maintain planter 104. One end of suspension members 103 are removably secured to hooks or the like near the upper ends of the legs 102, while the opposite end of suspension members 103 are secured (either removably or permanently) to planter 104.

In cases where suspension members 103 are chains, the chains may include a plurality of links in which the loop formed by each link can be hung on a hook. In this manner, the length of the chains between the planter 104 and the hooks can be adjusted. A user can selectively couple a particular link within the chain in order to set the desired length of the chain, and thus the desired height of the planter 104 with respect to the ground. Additionally, some chains may include removable links, allowing a user to adjust the length of the chain to a desired length by simply removing the appropriate number of links.

Suspension members 103 may be preferably configured to approximately equal lengths, such that the planter 104 is suspended substantially level with respect to the ground when the floor lamp is placed on level ground. The lengths of suspension members 103 may be adjusted based on the size of the plant within planter 104, the light sensitivity of the plant within planter 104, and/or for aesthetic reasons, among others.

The planter 104 may be any receptacle capable of maintaining a plant therein. The planter 104 may be included with the floor lamp (i.e., sold together as a product), or may be obtained separately.

The position of planter 104 may be manually adjusted by altering the length of suspension members 103. As illustrated in FIG. 1, planter 104 can be lowered to position 105. Other positions are also possible. In this manner, the position of planter 104 may be adjusted to accommodate a variety of plant sizes, as well as to provide an optimal distance between light emitted downward by a grow lamp and planter 104.

Tray 106 may be a planter tray, water-collecting basin, another planter, or any other type of receptacle that rests on platform 107. Tray 106 may be arranged to collect excess water dripping from planter 104 above or from a separate planter thereon.

Platform 107 may be fixed to one or more of legs 102 for providing stability to the floor lamp and to provide a surface on which items may be placed. Platform 107 may allow a user to put decorative items beneath planter 104. In some instances, platform 107 may serve to hold tray 106.

Shroud 116 is a piece of opaque cloth or fabric that can be attached to the legs 102 and block at least a portion of the ambient environmental light from reaching planter 104. Shroud 116 is described in more detail below with respect to FIG. 7.

Figure 2:
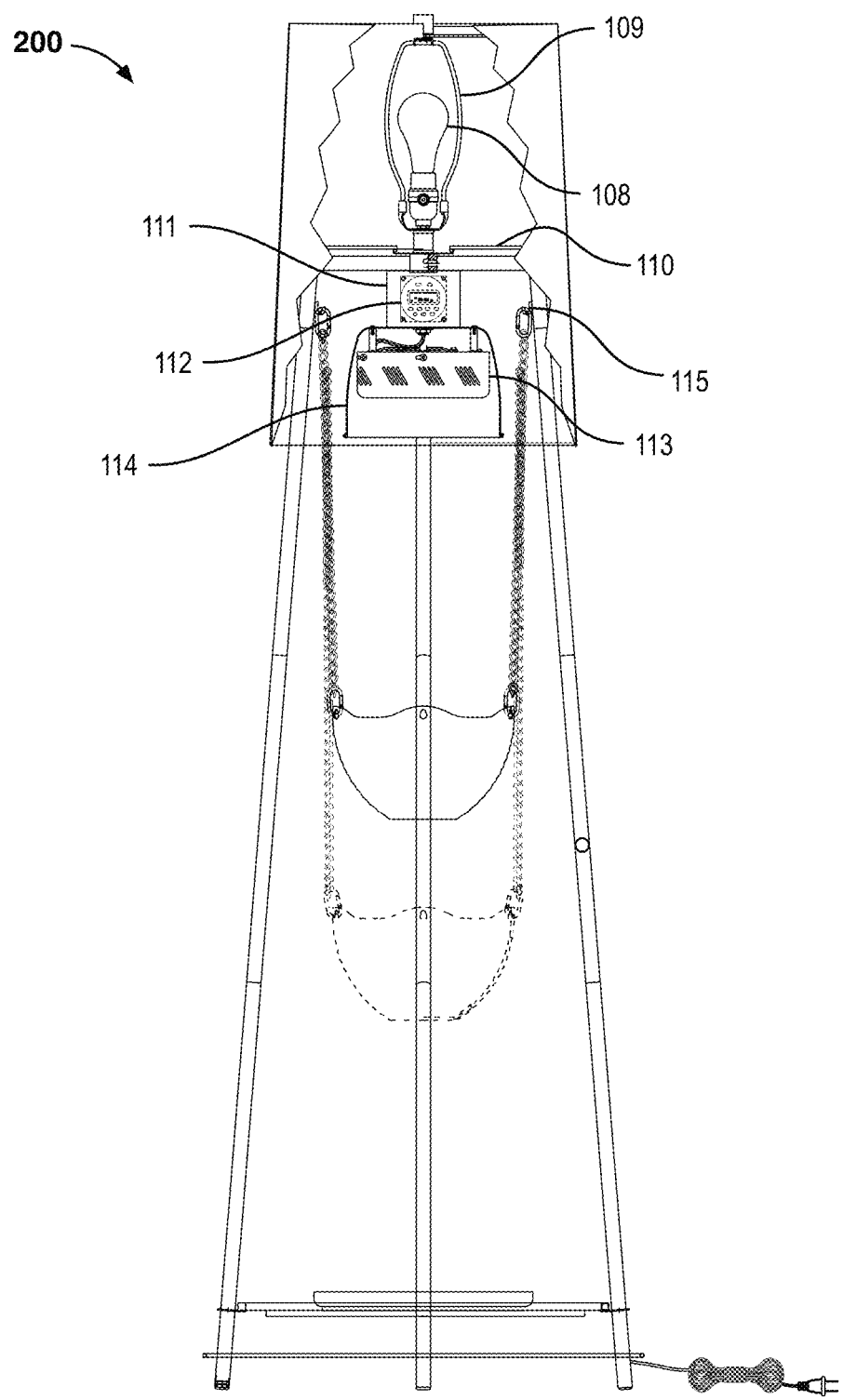
FIG. 2 is an elevated side view, partially in phantom, of an example floor lamp with an integrated plant growth system.

FIG. 2 is a side view 200 partially in phantom of the example floor lamp with an integrated plant growth system. With shade 101 drawn in phantom, upper light source 108, harp 109, central support structure 110, downlight 111, downlight driver 112, LED array 113, reflector 114, and hook 115 can be seen. It should be understood that shade 101 in this example horizontally surrounds these components, such that they cannot be seen when the floor lamp is viewed from the side.

Light source 108 may include any combination of lighting elements, such as incandescent bulbs, fluorescent bulbs, and/or LED bulbs. Light source 108 may be controlled by a switch and be partially surrounded by shade 101. Depending on the type of light bulb used, light source 108 may directionally emit light substantially upwardly, outwardly, horizontally, and/or omnidirectionally. The opening at the top of shade 101 may primarily direct light from light source 108 upwardly to provide indirect illumination of an indoor environment.

Harp 109 may serve as a support structure to hold shade 101. Harp 109 may be adjustable in height to allow the position of shade 101 to be adjusted, in some implementations. Harp 109 may be secured to a base structure housing an electrical light bulb socket, as shown in FIG. 2.

Central support structure 110 may be any structural element to which one or more components of the floor lamp are fixed. As depicted in FIG. 2, central support structure 110 is a mounting point to which light source 108, harp 109, legs 102, and downlight 111 are affixed. The central support structure 110 may be a platform with various mounting points to which components of the floor lamp can be secured by a user assembling the floor lamp.

Downlight 111 may include any combination of lighting elements, such as incandescent bulbs, fluorescent bulbs, and/or LED bulbs, which are directed substantially downward toward planter 104. In some examples, downlight 111 is a grow light operable to emit photosynthetically active radiation (PAR) that facilitates and/or enhances plant growth. An example spectrum emitted by downlight 111 is illustrated in the spectral intensity graph 600 of FIG. 6.

In some implementations, downlight 111 includes driver 112 for driving LED array 113. Driver 112 may include electronics, circuit elements, processor(s), power converters, memory, button(s), switch(es), and/or any combination thereof. Driver 112 may include power electronics for converting an input alternating current (AC) power source to LED-compatible direct current (DC) power.

An example driver 112 includes a timer assembly for periodically turning the LED array 113 on and off. The timer assembly may include a combination of software and hardware that turns the LED array 113 on and off according to predetermined or user-designated intervals. For instance, the timer assembly repeatedly may turn LED array 113 on for a first duration of time, then off for a second duration of time to simulate day and night cycles.

Driver 112 may include buttons, switches, and a display device to enable a user to configure the operation of downlight 111 and monitor the status of the downlight 111. For example, the display device may show the amount of time remaining on the timer, while buttons and/or switches enable the user to start the timer, stop the timer, adjust the duration of the timer, and/or manually control LED array 113.

LED array 113 may include any combination of LEDs that collectively emit light that facilitates or enhances plant growth. LED array 113 may include two or more different LED types, where each type of LED is operable to emit a narrow-wavelength band of light. As described herein, one type of LED may be described as emitting a particular wavelength of light; however, most LEDs emit light within a narrow range of wavelengths centered around that particular wavelength. It should therefore be understood that a "660 nm LED" refers to an LED whose light emission is a narrow band centered around a 660 nm wavelength.

Figure 6:
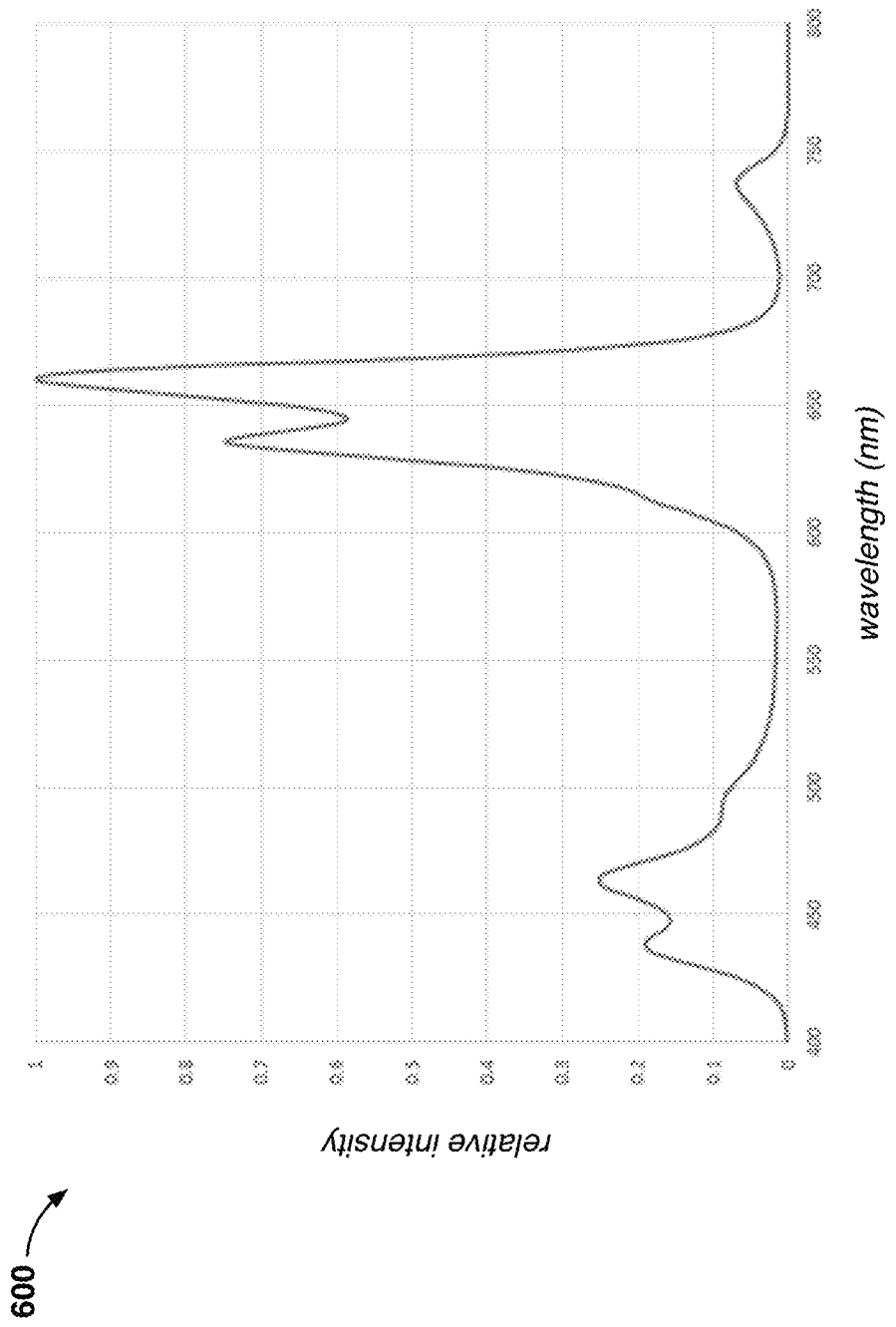
FIG. 6 is a spectral graph of the example grow light cluster of FIG. 5.

LED array 113 may include a specific combination of LEDs that collectively achieve an optimum or preferable emission spectrum to facilitate the growth of a particular plant. As one specific example, LED array 113 includes twelve 660 nm LEDs, six 620 nm LEDs, two 460 nm LEDs, one 430 nm LED, one 730 nm LED, one 610 nm LED, one 505 nm LED, and one 6500K white LED. This emission spectrum is illustrated in FIG. 6. Other LED combinations and ratios are also possible.

Downlight 111 also includes reflector 114. Similar to shade 101, reflector 114 may be substantially cylindrical in shape and include an opening for directing light in a particular direction. In the arrangement shown in FIG. 2, reflector 114 is bell-shaped with an opening at the bottom to direct light emitted by LED array 113 substantially downward toward planter 104. Reflector 114 may be opaque or translucent. In some implementations, reflector 114 horizontally surrounds LED array 113 such that LED array 113 cannot be seen when downlight 111 is viewed from the side or above.

Hook 115 may be a curved support structure coupled to one of the legs 102 to which one of the support members 103 can be secured. For instances in which support members 103 are chains, a particular link of the chain may be selectively coupled to hook 115, thereby designating the length of that support member between hook 115 and planter 104. Hook 115 may be secured to or integrally formed near the upper end of one of the legs 102, such that hook 115 is obscured from view by shade 101. Floor lamps of the present disclosure might include a hook on each of the legs 102, such that there is a respective hook for each of the support members 103.

Figure 4:
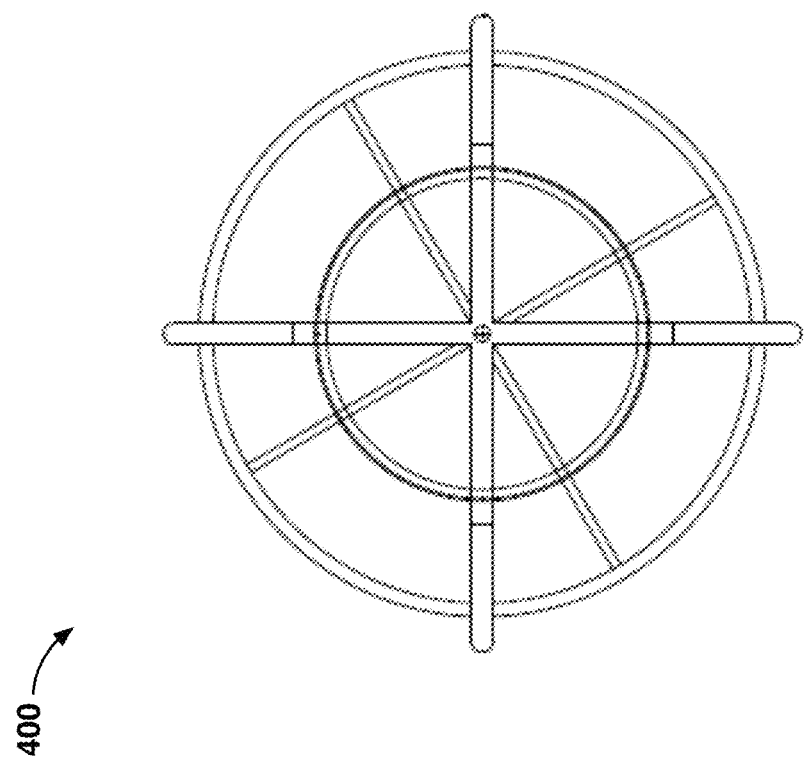
FIG. 4 is a bottom plan view of an example floor lamp with an integrated plant growth system.
Figure 3:
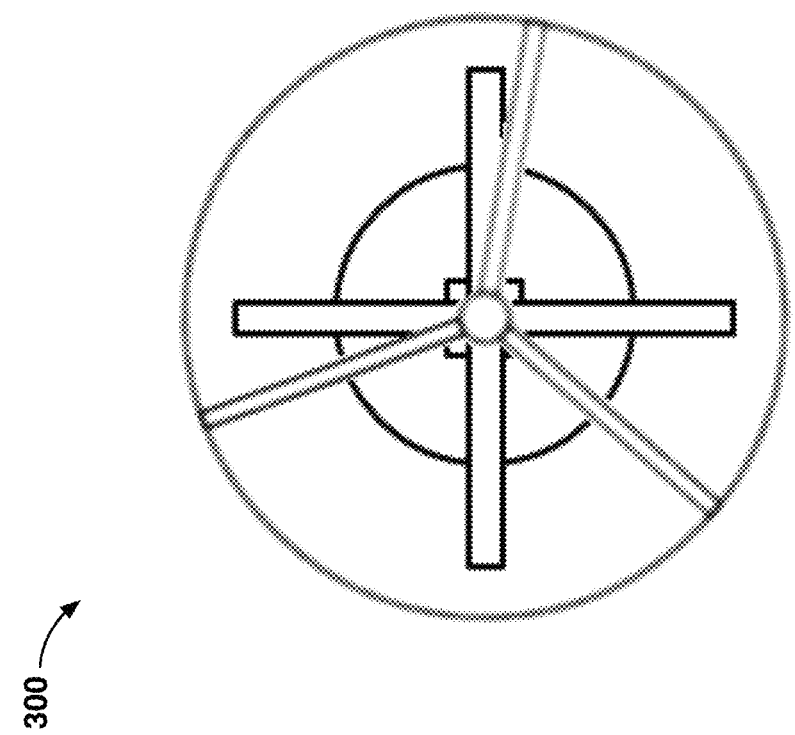
FIG. 3 is a top plan view of an example floor lamp with an integrated plant growth system.

FIG. 3 is a top plan view 300 of an example floor lamp with an integrated plant growth system. FIG. 4 is a bottom plan view 400 of an example floor lamp with an integrated plant growth system.

Figure 5:
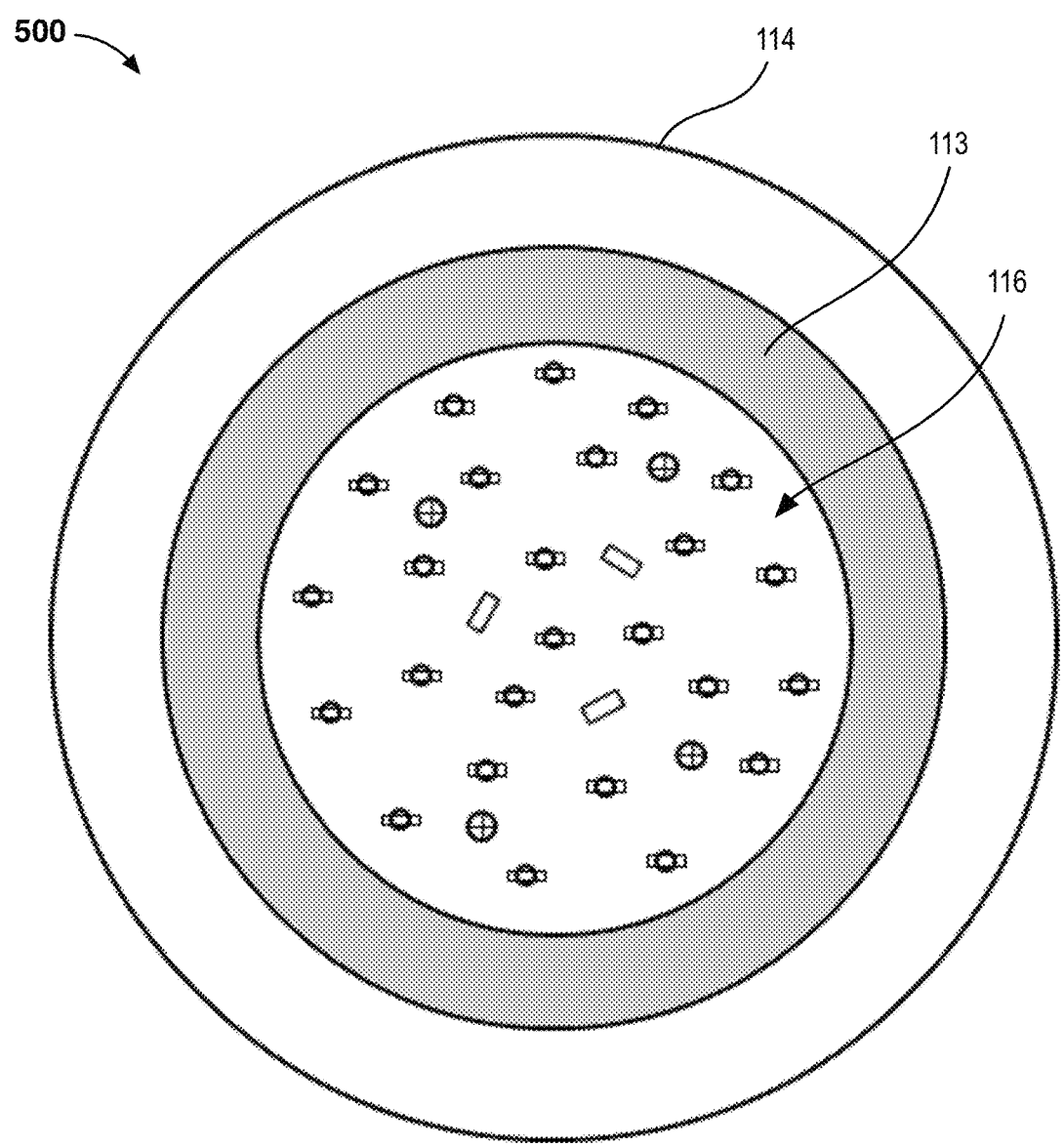
FIG. 5 is a bottom plan view of an example grow light/LED cluster.

FIG. 5 is a bottom plan view 500 of an example grow light, such as downlight 111 illustrated in FIG. 2. The outer circle represents reflector 114. The darker circular region represents the housing of downlight 111. The central region shows an example arrangement of a cluster of LEDs within LED array 113. In this example, LED array 113 includes a plurality of surface mount device (SMD) LEDs arranged in a two-dimensional array.

As described above, FIG. 6 is a spectral graph 600 of an example grow light. The x-axis is the wavelength of light in nanometers, while the y-axis is the relative spectral intensity (unitless). In spectral graph 600, the highest peaks are near 660 nm and 620 nm, while lower peaks are present at 430 nm, 460 nm, 505 nm, and 730 nm. This spectrum emission may facilitate and enhance plant growth.

Figure 7:
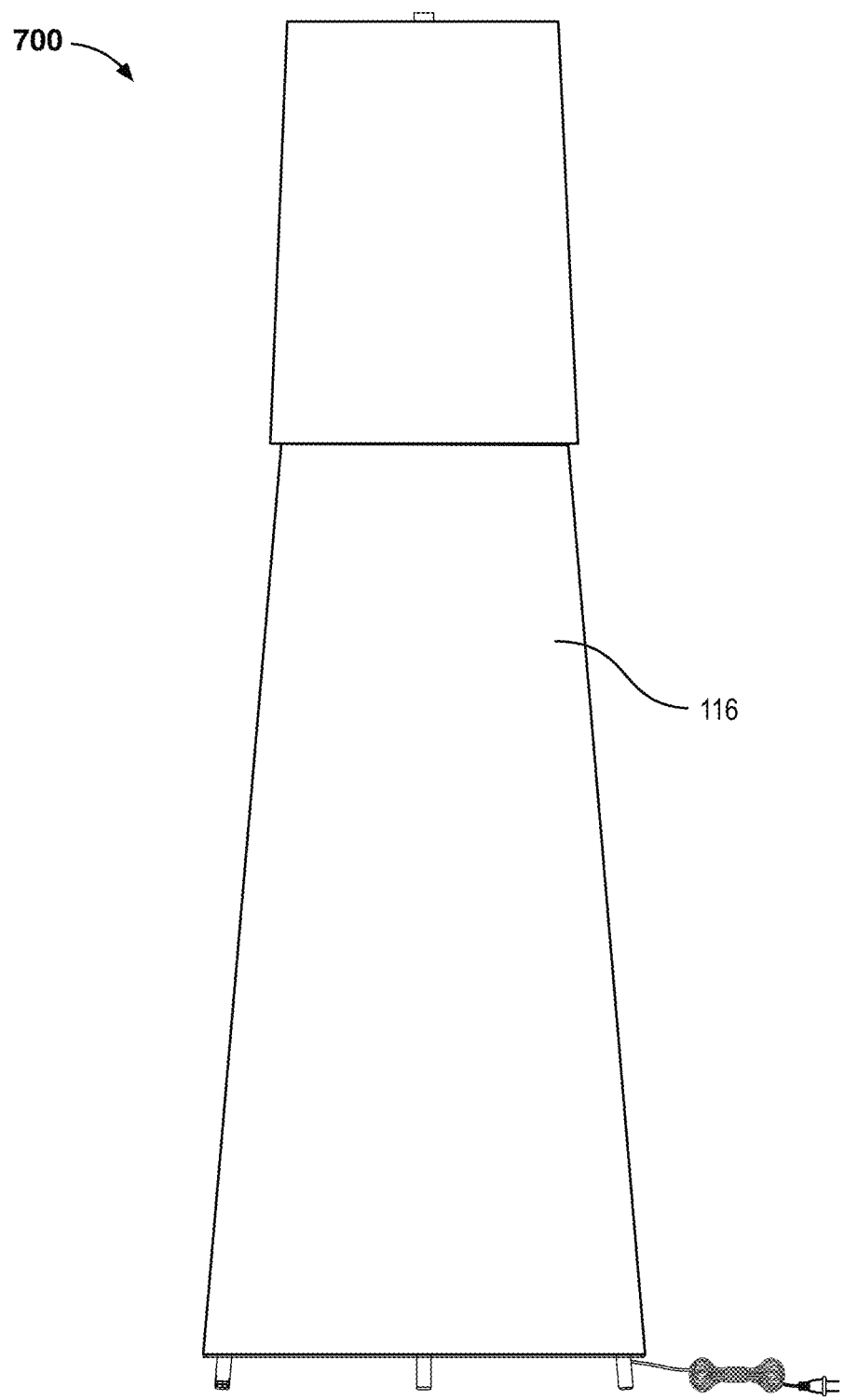
FIG. 7 is a side view of an example floor lamp having an integrated plant growth system with a shroud.

FIG. 7 is a side view 700 of an example floor lamp with an integrated plant growth system with a shroud 116. As described above, shroud 116 may be a piece of fabric or other material that can be secured around legs 102 of the floor lamp to block light from entering into the central region between legs 102. Shroud 116 may include button snaps, hook-and-loop fasteners, and/or other removable fasteners that enable a user to couple shroud 116 to legs 102 or shade 101. Shroud 116 may be opaque or translucent.

Shroud 116 may block or modulate the amount of ambient environmental light that is received by a plant in planter 104. For plants that are affected by ambient environmental light, shroud 116 may provide such plants with more controlled lighting conditions. Shroud 116 may, in some arrangements, partially cover legs 102 to allow some amount of ambient environmental light through to the planter 104. The specific configuration of shroud 116 may be set by a user to permit a desired amount (if any) of ambient environmental light through to planter 104.

Variations

Floor lamps and other light fixtures described herein may be étagères having additional open shelves. The shelves may be styled to enhance the aesthetic of the floor lamps.

Shades of floor lamps and other light fixtures described herein may be styled in a variety of ways. Some shades may be translucent glass (e.g., sand-blasted or frosted glass) that diffuses light and enhances the artistic style of the light fixture.

Electric power for lamps and other components of luminaires described herein may be provided via an electrical connection to an AC or DC power source, such as an AC wall outlet. Downlights and/or grow lights may include power electronics, such as AC-to-DC converters, which reduce the voltage level and serve as a DC power source for powering the driver and LEDs of the downlight and/or grow light. Internal power supplies separate from the downlight may also be incorporated within luminaires. An external DC power supply may electrically coupled to a luminaire as well.

The aesthetic qualities of a downlight or grow light may be configured to match the aesthetic qualities of other components of the luminaire. For example, the uplight and downlight may appear similar, such that luminaire does not give the appearance of a plant growth system and is elegantly blended in with the overall aesthetic of the luminaire.

The invention claimed is:

1. A luminaire comprising:
three or more substantially rigid legs each having an upper end and a lower end, said three or more legs being arranged in a frustum shape forming a central area, said upper ends of the three or more legs at least partially converging and being fixed with respect to each other, and said lower ends of the three or more legs at least partially diverging and being substantially coplanar to support the luminaire in an upright position on a ground surface;
a first lamp fixed to the top ends of the three or more legs and operable to emit light in a substantially upward direction;
a second lamp fixed to the top ends of the three or more legs and operable to emit light in a substantially downward direction;
three or more suspension members each having an end that is removably secured to a respective leg, each of said three or more suspension members having individually adjustable lengths, said three or more suspension members being configured to maintain a suspended planter substantially level with respect to the ground surface.

2. The luminaire according to claim 1, in which the second lamp is a grow light.

3. The luminaire according to claim 2, in which the grow light is operable to emit photosynthetically active radiation having wavelengths between 400 nanometers (nm) and 750 nm.

4. The luminaire according to claim 2, in which the grow light includes a white light source operable to emit light having a color temperature of 6500 K.

5. The luminaire according to claim 1, in which each suspension member comprises a plurality of links that collectively form a chain, wherein each leg includes a hook positioned proximate to the upper end of the leg, said hooks being adapted to engage with the links of respective suspension members, and wherein the length of each suspension member is adjustable by selectively engaging a particular link of the suspension member with its respective hook.

6. The luminaire according to claim 1, in which each suspension member comprises a plurality of links that collectively form a chain, wherein the links are individually removable from their respective chain, and wherein the length of each suspension member is adjustable by selectively removing one or more links from the chain.

7. The luminaire according to claim 1, in which the second lamp comprises:
one or more light emitting diodes (LEDs) of a first type operable to at least emit a first wavelength of light; and
one or more LEDs of a second type operable to at least emit a second wavelength of light,
wherein a combination of light emitted from the one or more LEDs of the first type and the one or more LEDs of the second type facilitates growth of photosynthetic organisms.

8. The luminaire according to claim 7, in which the first wavelength is 660 nm.

9. The luminaire according to claim 7, in which the second wavelength is 460 nm.

10. The luminaire according to claim 7, in which the second lamp further comprises:
a driver configured to control the one or more LEDs of the first type and the one or more LEDs of the second type; and
a substantially cylindrical reflector having an opening at a bottom end of the reflector, said reflector arranged to integrally surround the one or more LEDs of the first type and the one or more LEDs of the second type.

11. The luminaire according to claim 10, in which the driver comprises:
a timer assembly configured to (i) turn on the one or more LEDs of the first type and the one or more LEDs of the second type for a first duration of time and (ii) turn off the one or more LEDs of the first type and the one or more LEDs of the second type for a second duration of time.

12. The luminaire according to claim 11, in which the timer assembly comprises:
a display unit configured to display information related to the timer assembly; and
one or more switches configured to adjust operation parameters of the timer assembly.

13. The luminaire according to claim 1, in which the luminaire further comprises:
a substantially cylindrical shade arranged to integrally surround the first lamp and the second lamp, said shade having an opening at a top end of the shade, said shade having an opening at a bottom end of the shade.

14. The luminaire according to claim 13, in which the shade is translucent and configured to diffuse light emitted by at least the first lamp.

15. The luminaire according to claim 1, in which the luminaire further comprises:
a substantially conical frustum-shaped shade arranged to integrally surround the first lamp and the second lamp, said shade having an opening at a top end of the shade, said shade having an opening at a bottom end of the shade.

16. The luminaire according to claim 1, in which the luminaire further comprises:
a platform fixed to the three or more legs, said platform being substantially parallel with the plane defined by the lower ends of said three or more legs, and said platform being adapted to support a receptacle.

17. The luminaire according to claim 16, in which the receptacle is a planter tray.

18. The luminaire according to claim 1, in which each of the three or more legs is formed from a plurality of separable segments, each segment being adapted to engage with one or more neighboring segments.

19. The luminaire according to claim 1, in which the upper ends of the three or more legs, a bottom portion of the first lamp, and a top portion of the second lamp are coupled to a central support structure, said central support structure maintaining a spaced relationship between the upper ends of the three or more legs, a bottom portion of the first lamp, and a top portion of the second lamp.

20. The luminaire according to claim 1, in which the luminaire further comprises:
a shroud configured to be removably securable to the three or more legs to integrally surround the central area, said shroud blocking at least a portion of environmental light from entering the central area when the shroud is secured to the three or more legs.

* * * * *